United States Patent
Wong et al.

(10) Patent No.: US 9,929,948 B2
(45) Date of Patent: Mar. 27, 2018

(54) MINIMIZING NETWORK BANDWIDTH FOR TDM CES

(71) Applicant: ALCATEL-LUCENT CANADA INC., Ottawa (CA)

(72) Inventors: Kin Yee Wong, Ottawa (CA); Chad V. Mccarthy, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 165 days.

(21) Appl. No.: 14/501,721

(22) Filed: Sep. 30, 2014

(65) Prior Publication Data
US 2016/0094441 A1 Mar. 31, 2016

(51) Int. Cl.
*H04L 12/721* (2013.01)
*H04J 3/06* (2006.01)
*H04L 12/825* (2013.01)
*H04L 12/841* (2013.01)

(52) U.S. Cl.
CPC ............ *H04L 45/68* (2013.01); *H04J 3/0632* (2013.01); *H04L 47/25* (2013.01); *H04L 47/283* (2013.01)

(58) Field of Classification Search
CPC ....... H04L 45/68; H04L 45/50; H04L 47/826; H04L 47/25; H04L 47/283; H04J 3/0632; H04W 28/06
See application file for complete search history.

(56) References Cited

U.S. PATENT DOCUMENTS

| | | | |
|---|---|---|---|
| 6,870,837 B2 | 3/2005 | Ho et al. | |
| 6,996,626 B1 * | 2/2006 | Smith | H04L 65/80 370/352 |
| 7,457,315 B1 * | 11/2008 | Smith | G10L 19/012 370/473 |
| 7,590,070 B1 | 9/2009 | Asawa et al. | |
| 2009/0109837 A1 * | 4/2009 | Kini | H04L 41/06 370/216 |
| 2010/0165922 A1 * | 7/2010 | Wang | H04S 1/007 370/328 |
| 2010/0315941 A1 * | 12/2010 | Rorai | H04J 3/0605 370/216 |

OTHER PUBLICATIONS

RFC 5086—Vainshtein et al, "Structure-Aware Time Division Multiplexed (TDM) Circuit Emulation Service over Packet Switched Network (CESoPSN)", Dec. 2007, all pages.*

* cited by examiner

*Primary Examiner* — Asad Nawaz
*Assistant Examiner* — Thomas R Cairns
(74) *Attorney, Agent, or Firm* — Kramer & Amado, P.C.

(57) ABSTRACT

A method and system are provided for reducing bandwidth usage in TDM CES systems. When a transmitting router receives a signal indicating that the access circuit is other than "normal", and that therefore any TDM data arriving over the access circuit is not valid, the router signals a receiving router at the far end of a TDM Pseudowire that no packets will be sent and does not send any packets. When the receiving router receives such a signal it starts generating its own packets for placing in its jitter buffer. In this way, the jitter buffer maintains its fill level even when no packets are being sent. When the transmitting router receives notification indicating that its access circuit has returned to normal the router signals the receiving router that status has returned to normal, and begins sending packets again.

17 Claims, 6 Drawing Sheets

MINIMIZING NETWORK BANDWIDTH FOR TDM CES

FIELD OF INVENTION

This invention relates to CESoP services, and more particularly to reduction of bandwidth in such services.

BACKGROUND

Core networks are evolving to packet switched networks and old TDM-type networks are gradually being replaced. However many legacy TDM services still exist. These TDM services may be for trunking links (T1/E1/DS3/SONET/SDH) or for voice services, for example. Circuit Emulation Services (CES) are used to provide TDM services in IP/MPLS networks in order to take advantage of these packet switched networks. A TDM Pseudowire (PW) is established across the packet switched network. TDM frames are received from an access circuit at a router at the edge of the packet switched network through an access port on the router. The router then encapsulates the TDM frames and transmits the encapsulated TDM data as packets to a receiving router over the TDM-PW through the packet switched network. IETF and MEF have multiple standards that define how to encapsulate TDM services into TDM-PWs.

If the router receives an indication from the access circuit that the access circuit is not in a normal state (e.g. LOS, LOF, AIS), the router signals the receiving router of this by setting the L bit in the LRM bits of the TDM-PW control word to a value of "1". The receiving router knows to ignore any packets in which the L bit has been set to "1". However the transmitting router still sends packets to the receiving router, even though there is no valid TDM data to send. In one implementation, the transmitting router still sends packets to the receiving router with the invalid TDM data as payload. In another implementation, if the option to suppress the TDM data is chosen, the transmitting router does not send payload data. However even if the payload is being suppressed, the transmitting router still sends packets, containing only encapsulation headers, to the receiving router. Since the header in a TDM CES packet can make up as much as 95% of the size of the whole packet, this results in little saving of bandwidth.

Even though the bandwidth of TDM PWs in routers is usually small compared to the bandwidth used by other IP or Ethernet services, there are many instances where network operators have small network links and the TDM PW bandwidth is too high. Examples of small network links are microwave communication links and N×T1 channels in SONET. There is a need to provide a method and system in which the network operator has more flexibility regarding bandwidth usage in CES.

SUMMARY

According to one aspect, a method of reducing bandwidth usage in a TDM-PW (time division multiplexing pseudowire) is provided. Notification is received at a transmitting router that the status of an access circuit for the TDM-PW is other than normal. The transmitting router signals to a receiving router that no packets corresponding to the TDM-PW will be sent, and refrains from transmitting packets over the TDM-PW. Upon receipt of such a signal, the receiving router generates packets and places the generated packets in a jitter buffer of the receiving router.

According to another aspect, a router providing circuit emulation services is provided. The router includes a processor and memory. The memory includes instructions that, when executed by the processor, cause the router to monitor for receipt of a notification that the status of an access circuit for a time division multiplexing-pseudowire (TDM-PW) is other than normal. The memory also includes instructions that cause the router to, upon receipt of such a notification, signal to a receiving router at the other end of the TDM-PW that no packets will be sent over the TDM-PW and to halt transmitting packets over the TDM-PW.

According to yet another aspect, another router providing circuit emulation services is provided. The router includes a processor and memory. The memory includes instructions that, when executed by the processor, cause the router to monitor for receipt of a signal from a transmitting router at the other end of a time division multiplexing pseudowire (TDM-PW) that no packets are being sent over the TDM-PW. The memory also includes instructions that cause the router to, upon receipt of such a signal, generate packets and place the generated packets in a jitter buffer.

The methods of embodiments of the invention may be stored as logical instructions on a non-transitory computer-readable storage medium in a form executable by a computer processor.

Embodiments of the invention allow the reduction of bandwidth in CES. In response to a notification that the access service is not in a normal state, a source-end router of the TDM PW notifies the destination-end router not to expect any packets at all and sends no packets. Thereafter no packets are sent at all for the duration of the fault, saving bandwidth. The notification ensures that the destination-router can maintain the fill-level of its jitter buffer.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
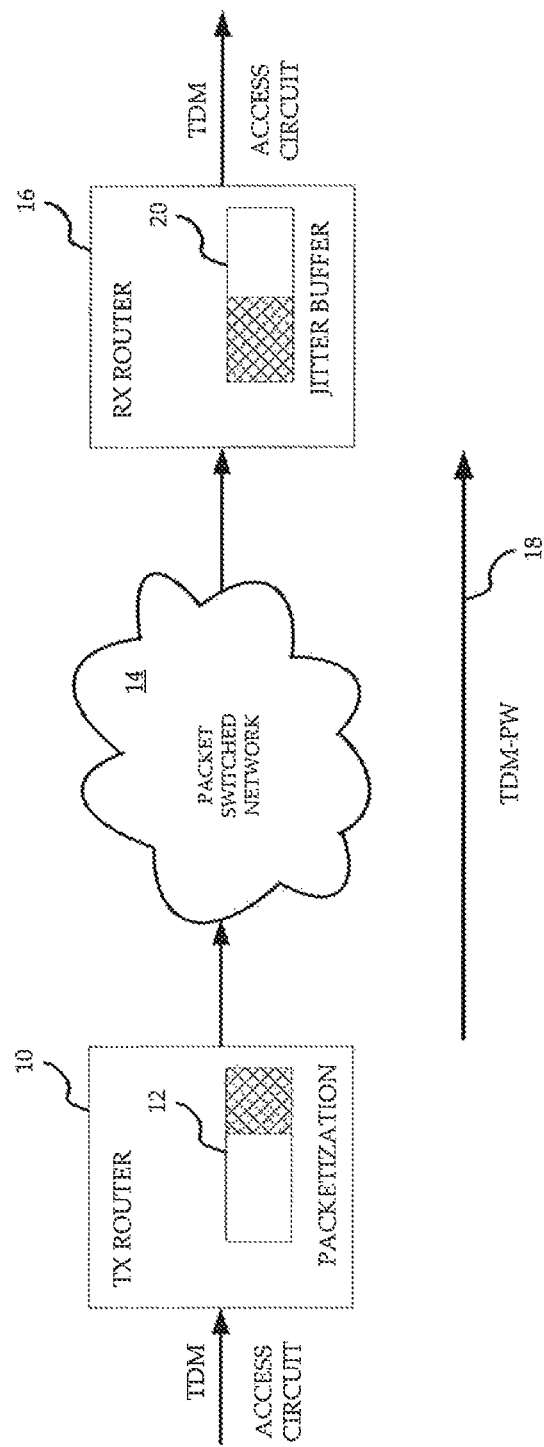
FIG. 1 is a block diagram of a portion of a TDM CES system.

Referring to FIG. 1, a block diagram of a portion of a TDM (time-division multiplexing) CES (circuit emulation service) system according to one embodiment of the invention is shown. TDM data is passed to a transmitting router 10 through an access circuit, the transmitting router 10 providing CES. A CESoP (circuit emulation service over packet) processor (not shown in FIG. 1) within the transmitting router 10 packetizes 12 the TDM data, and sends the encapsulated TDM data as packets through a packet switched network 14 to a receiving router 16, which also provides CES, over a TDM-Pseudowire (PW) 18. At the receiving router 16 a CESoP processor places the incoming packets in a jitter buffer 20, and then sends the packets to a TDM interworking function where the data is played out in a TDM bitstream and sent to an access circuit.

The TDM data arrives at the transmitting router 10 over any TDM circuit, such as RS-232, C.3794, DS0, DS1, DS3, E1, E3, SONET, or SDH, as examples. Implementations of the TDM-PW are defined in IETF RFC 5086, IETF RFC 4553, and MEF.8

The routers in FIG. 1 have been named a transmitting router and a receiving router. For the sake of clarity, conveying of TDM data over the packet switched network 14 is shown in FIG. 1 in one direction only. TDM data is of course conveyed in the other direction as well (i.e. to the left in FIG. 1), with what is denoted as the transmitting router 10 also having a jitter buffer and what is denoted as the receiving router 16 also having a packetization functionality. However, for the purposes of this description, only traffic in one direction (i.e. to the right in FIG. 1) will be considered.

Figure 2:
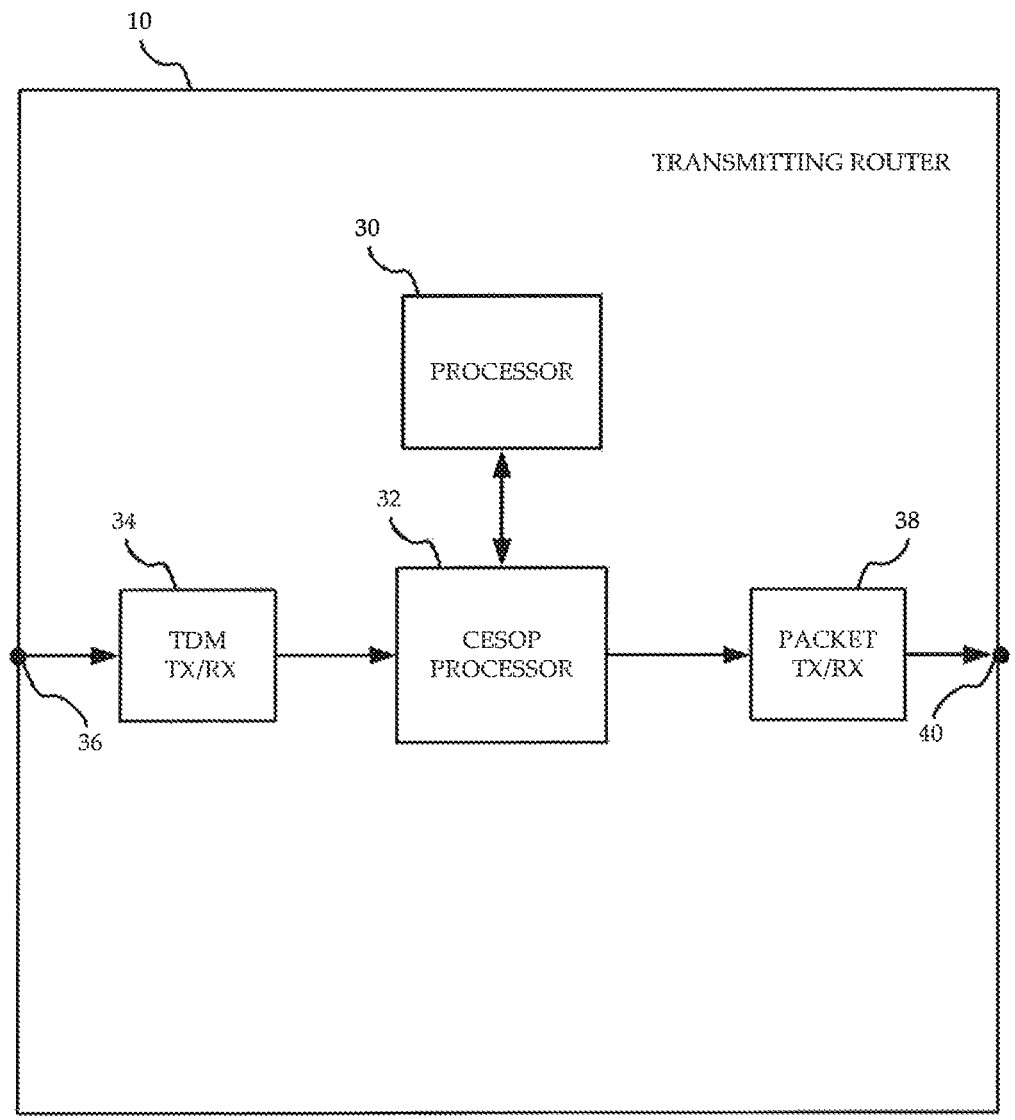
FIG. 2 is a block diagram of portions of the transmitting router of FIG. 1.

Referring to FIG. 2, a simplified block diagram of the transmitting router 10 of FIG. 1 is shown. In particular, FIG. 2 shows the components of the transmitting router 10 involved in Circuit Emulation Service over Packet (CESoP) operations. The first router 10 includes a general purpose processor 30. The general purpose processor 30 is in communication with a CESoP processor 32 which controls the CESoP functions of the router 10. The CESoP processor 32 includes the TDM interworking function and is in communication with a TDM transmit/receive function 34, which receives TDM data through an access port 36. The CESoP processor 32 is also in communication with a packet transmit/receive function 38, including a packet switch and interfaces, which in turn is in communication with the rest of the packet switched network 14 (not shown in FIG. 2) through a port 40.

Figure 3:
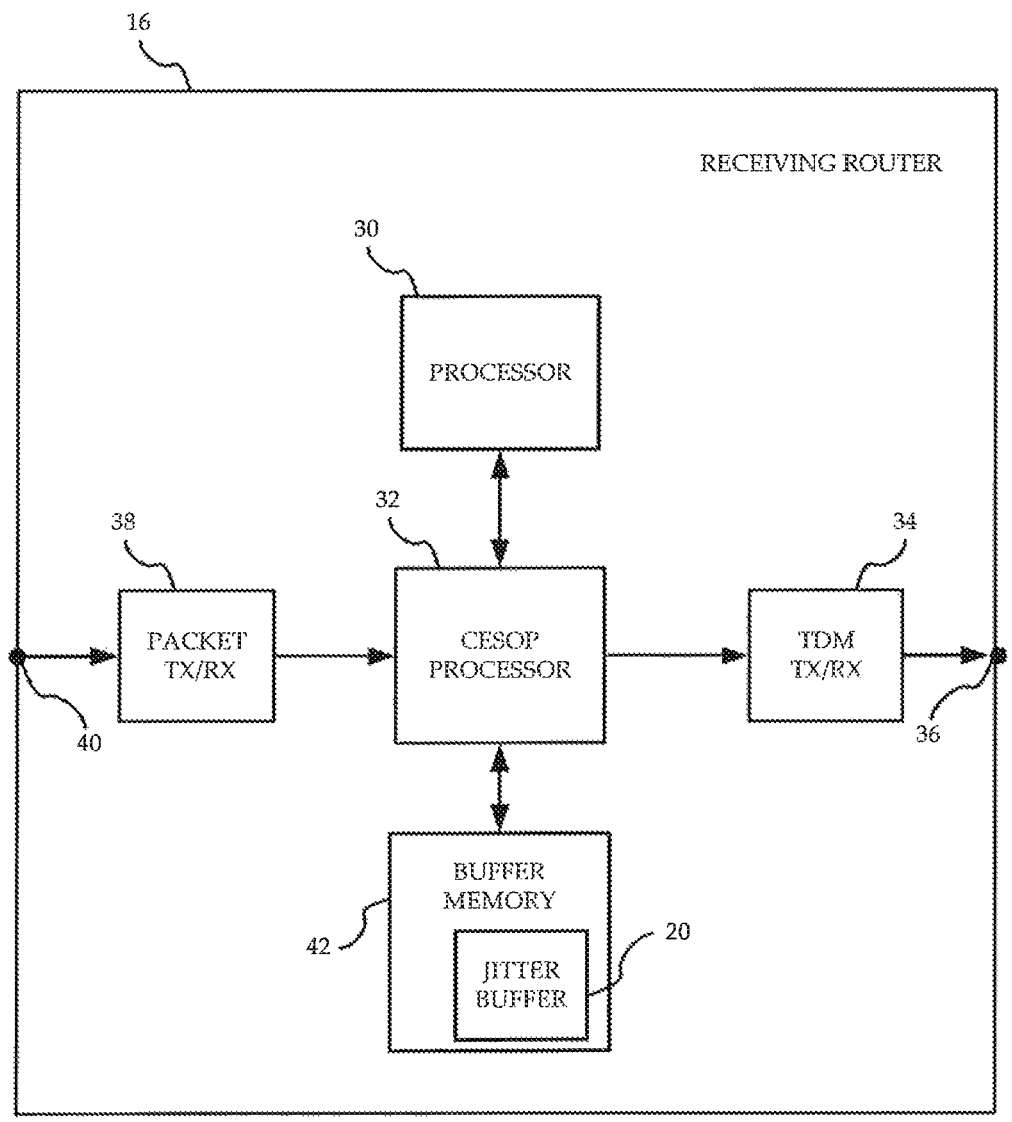
FIG. 3 is a block diagram of portions of the receiving router of FIG. 1.

Referring to FIG. 3, a simplified block diagram of the receiving router 16 of FIG. 1 is shown. The receiving router 16 includes the same components as shown in FIG. 2. In addition, the jitter buffer 20 is considered. The CESoP processor 32 is in communication with a buffer memory 42. A portion of the buffer memory 42 comprises the jitter buffer 20.

Broadly, a transmitting router receives a notification that the status of an access circuit for the TDM-PW is other than normal. The transmitting router signals to a receiving router that no packets corresponding to the TDM-PW will be sent, and refrains from transmitting packets over the TDM-PW. Upon receipt of a signal from the transmitting router that no packets corresponding to the TDM-PW will be sent, the receiving router generates packets and places the generated packets in a jitter buffer of the receiving router.

Figure 4:
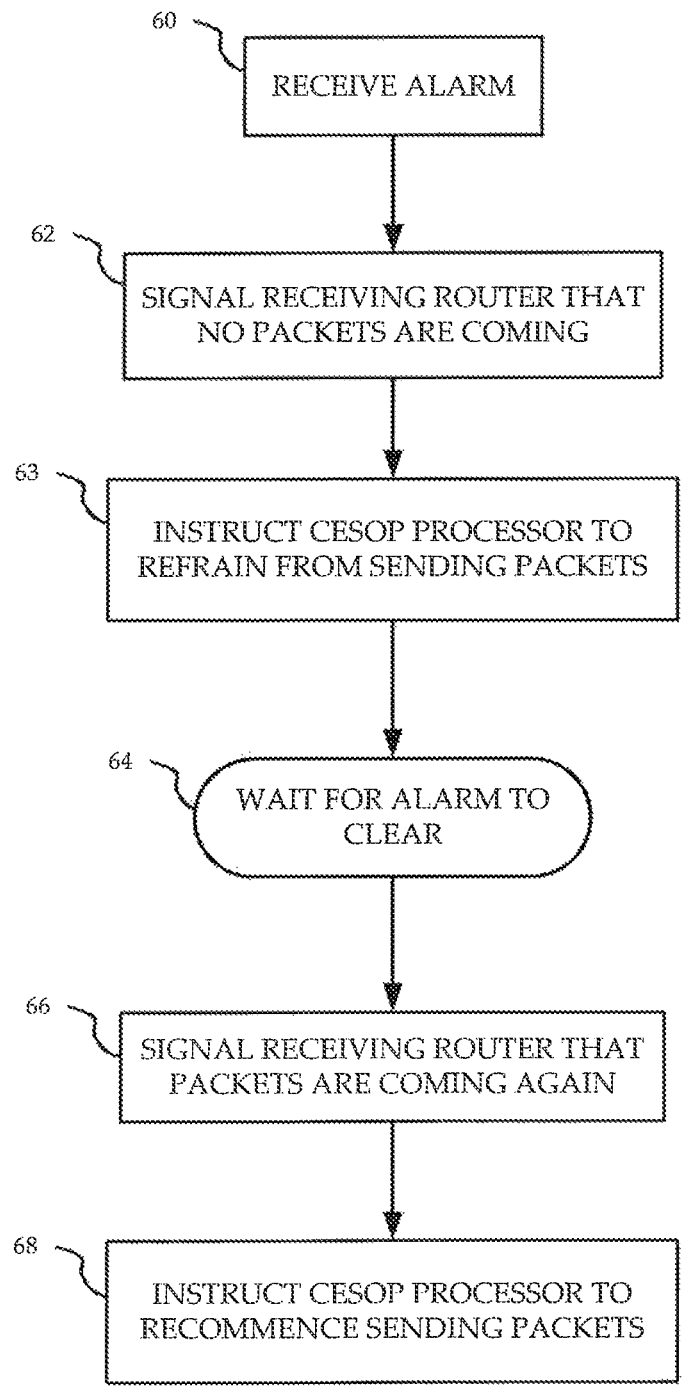
FIG. 4 is a flowchart of a method carried out by the transmitting router of FIG. 1 according to one embodiment of the invention.

Referring to FIG. 4, a flowchart of a method carried out by the transmitting router 10 of FIG. 1 according to one embodiment of the invention is shown. The method is carried out by the general purpose processor 30 of the transmitting router 10. TDM data is already being received by the transmitting router, being encapsulated, and being sent over the TDM-PW 18 to the receiving router 16. The transmitting router 10 monitors for receipt of an alarm at the physical layer through the access port 36 that the access circuit is not in a normal state. The alarm can indicate, as examples, LOS (Loss of Signal), LOF (Loss of Frame), or AIS (Alarm Indication Signal). The processor 30 is notified of this alarm at step 60. At step 62 the processor 30 causes the transmitting router 10 to signal to the receiving router 16 that no data will be coming over the TDM-PW 18 until further notice. The transmitting router 10 can send this signal in any of a number of ways. For example, the transmitting router 10 can send the signal implicitly by setting the L and M bits in the LRM bits of the TDM-PW control word of a packet to a particular value. This is possible because under RFC 5086 there exist "Reserved for future use" combinations for four of the L and M bit combinations. As another example, the transmitting router 10 can send an explicit out-of-band signal at the signaling layer of MPLS.

In one alternative, the transmitting router 10 can include additional information in the signaling sent at step 62 to the receiving router 16. For example, the sequence number of the last packet containing valid data can be included in the signaling.

At step 63 the processor 30 instructs the CESoP processor 32 to refrain from sending packets over the TDM-PW 18 to the receiving router 16. At step 64 the processor 30 awaits notification of a signal received over the access port 36 that the status of the access circuit has returned to normal. The effect of steps 63 and 64 is that during the time that the processor 30 is waiting for the status of the access circuit to return to normal, the transmitting router 10 does not send any packets over the TDM-PW 18. When the processor 30 receives notification that a signal indicating that the access circuit has returned to a normal status has been received, then at step 66 the processor 30 causes the transmitting router 10 to signal the receiving router 16 that valid data is coming once again. This can be done using either an explicit signal (such as if the signaling is by way of out-of-band signaling using the signaling layer of MPLS) or done implicitly (such as by transmitting encapsulated TDM data to the receiving router with the L and M bits set to the normal values indicating a valid CESoP data packet). At step 68 the processor 30 instructs the CESoP processor 32 to resume sending packetized TDM data.

In one embodiment, the steps 66 and 68 are combined. In other words, the signaling that valid TDM data is coming is performed by simply transmitting a packet containing valid TDM data as payload data, with the TDM-PW control word of the packet indicating that the payload contains valid data.

Figure 5:
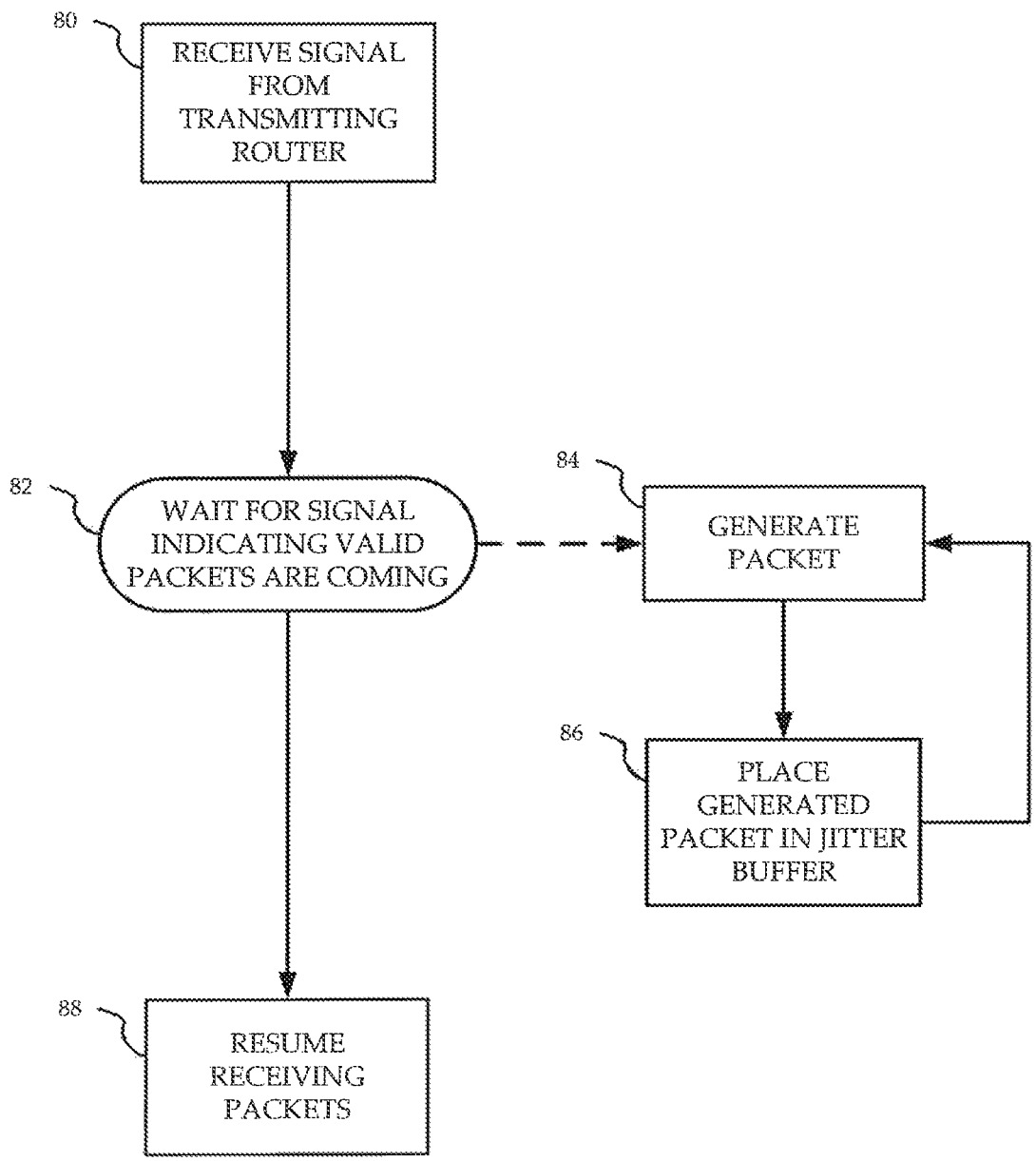
FIG. 5 is a flowchart of a method carried out by the receiving router of FIG. 1 according to one embodiment of the invention.

Referring to FIG. 5, a flowchart of a method carried out by the receiving router 16 of FIG. 1 according to one embodiment of the invention is shown. The method is carried out by the general purpose processor 30 of the receiving router 16. At step 80 the processor 30 receives a notification that a signal has been received by the receiving router 16 from the transmitting router 10 indicating that no packets will be sent by the transmitting router 10. This signal can be either an explicit signal (such as an out-of-band signal in the signaling layer of MPLS) or an implicit signal (such as a packet in which the L and M bits of the TDM-PW control word have been set to a particular value).

At step 82 the processor 30 awaits notification that a signal has been received by the receiving router 16 from the transmitting router 10 that packets containing valid TDM data are coming. This signal can be either an explicit signal (such as an out-of-band signal in the signaling layer of MPLS) or an implicit signal (such as a packet in which the L and M bits of the TDM-PW control word have been set to value indicating normal CESoP data). Until such notification is received, the processor 30 generates at step 84 a packet to be placed in the jitter buffer of the receiving router 16. The content of this packet is configurable. For example, the generated packet can simply be a replication of the last valid packet that was received over the TDM-PW. As another example, the generated packet can contain a payload resulting in a TDM frame consisting entirely of "1"'s. At step 86 the processor 30 places the generated packet within the jitter buffer.

In this way the jitter buffer maintains its fill level. Valid data already in the jitter buffer when the receiving router 16 receives notification that no packets will arrive is played out as normal, followed by dummy packets generated by the general purpose processor 30. After all the valid data in the jitter buffer is played out, the jitter buffer will only contain generated packets, which are played out at the configured TDM rate. Only when the receiving router 16 starts receiving valid packets again, as described below, are valid packets placed in the jitter buffer 20 again, to be played out when they reach the head of the queue.

When the processor 30 receives notification at step 82 that a signal has been received by the receiving router 16 from the transmitting router 10 that packets containing valid TDM data are coming, then at step 88 the processor 30 instructs the CESoP 32 of the receiving router 16 to resume receiving packets and placing them in the jitter buffer 20. Since the general purpose processor 30 is no longer generating packets and placing them in the jitter buffer 20, valid packets will soon (once they work their way through the jitter buffer 20 as dummy packets are played out) be played out.

The methods have been described above as being carried out by a general purpose processor 30 in communication with a CESoP processor 32. Alternatively, other components within the router can execute the logic of the methods described. For example, a modified CESoP processor 32 may carry out the methods, with appropriate changes to FIG. 4 and FIG. 5.

The methods described above are preferably implemented as logical instructions in the form of software. Alternatively, the methods may be implemented by hardware, or as a combination of software or hardware. If in the form of software, the logic may be stored on a non-transitory computer-readable storage medium in a form executable by a computer processor. The logic of the methods may be implemented by a general purpose processor, a network processor, a digital signal processor, an ASIC, or multiple such devices.

Figure 6:
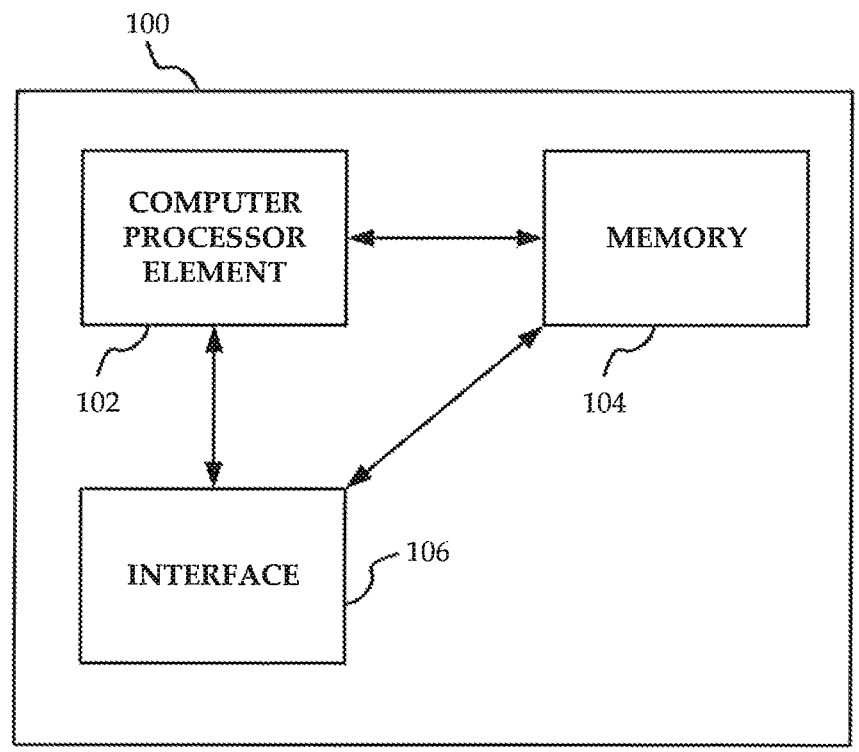
FIG. 6 is a block diagram of a computing environment according to one embodiment of the invention.

A simplified block diagram of one embodiment of a part of either router is shown in FIG. 6 as a processor assembly 100. The processor assembly 100 includes a computer processor element 102 (e.g. a central processing unit and/or other suitable processor(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the methods described above are implemented as software instructions loaded into the memory 104 and causing the computer processor element 102 to execute the methods.

The embodiments presented are exemplary only and persons skilled in the art would appreciate that variations to the embodiments described above may be made without departing from the spirit of the invention. The scope of the invention is solely defined by the appended claims

We claim:

1. A method of reducing bandwidth usage in a TDM-PW (time division multiplexing pseudowire), comprising:
   receiving notification at a transmitting router that the status of an access circuit for the TDM-PW is other than normal;
   signaling from the transmitting router to a receiving router that no packets corresponding to the TDM-PW will be sent;
   refraining from transmitting packets over the TDM-PW;
   at the receiving router,
      upon receipt of a signal from the transmitting router that no packets corresponding to the TDM-PW will be sent: generating packets; and
      placing the generated packets in a jitter buffer of the receiving router.

2. The method of claim 1 wherein signaling from the transmitting router to a receiving router that no packets corresponding to the TDM-PW will be sent comprises setting L and M bits in the LRM bits of the TDM-PW control word of a packet to a particular value.

3. The method of claim 1 wherein signaling from the transmitting router to a receiving router that no packets corresponding to the TDM-PW will be sent comprises sending an out-of-band signal at the signaling layer of MPLS.

4. The method of claim 1 wherein generating packets comprises generating packets identical to the valid packet that was most recently received over the TDM-PW.

5. The method of claim 1 wherein generating packets comprising packets which contain encapsulated TDM data containing only "1"s.

6. The method of claim 1 wherein signaling from the transmitting router to the receiving router that no packets corresponding to the TDM-PW will be sent further comprises conveying a sequence number of the last valid packet sent over the TDM-PW.

7. The method of claim 1 further comprising:
   at the transmitting router, monitoring for notification that the access circuit for the TDM-PW has returned to a normal status;
   signaling from the transmitting router to the receiving router that packets corresponding to the TDM-PW are once again being sent; and
   upon receipt at the receiving router of a signal from the transmitting router that packets corresponding to the TDM-PW are one again being sent, halting generating of packets and resuming placing of received packets in the jitter buffer.

8. The method of claim 7 wherein signaling from the transmitting router to the receiving router that packets corresponding to the TDM-PW are once again being sent comprises sending a packet containing valid TDM data and the L and M bits in the LRM bits of the TDM-PW control word of the packet having values indicating that the packet contains valid CESoP (circuit emulation service over packet) data.

9. The method of claim 7 wherein signaling from the transmitting router to the receiving router that packets corresponding to the TDM-PW are once again being sent comprises sending an out-of-band signal at the signaling layer of MPLS.

10. A router providing circuit emulation services, the router comprising:
   a processor, and memory, the memory comprising instructions that, when executed by the processor, cause the router to: monitor for receipt of a notification that the status of an access circuit for a time division multiplexing-pseudowire (TDM-PW) is other than normal; and upon receipt of a notification that the status of an access circuit for the TDM-PW is other than normal: signal to a receiving router at the other end of the TDM-PW that no packets will be sent over the TDM-PW; and halt transmitting packets over the TDM-PW.

11. The router of claim 10 wherein the instructions to signal the receiving router comprise instructions to set L and M bits in the LRM bits of the TDM-PW control word of a packet to a particular value.

12. The router of claim 10 wherein the instructions to signal the receiving router comprise instructions to send an out-of-band signal at the signaling layer of MPLS.

13. The router of claim 10 further comprising instructions within the memory that, when executed by the processor, cause the router to:

monitor for receipt of a notification that the access circuit for the TDM-PW has returned to a normal status; and signal to the receiving router that packets corresponding to the TDM-PW are once again being sent.

14. The router of claim 13 wherein the instructions to signal to the receiving router that packets corresponding to the TDM-PW are once again being sent comprise instructions to set the L and M bits in the LRM bits of a TDM-PW control word of a packet to a value indicating that the packet contains valid CESoP (circuit emulation service over packet) data.

15. The router of claim 10 wherein the instructions to generate packets comprise instructions to generate packets identical to the valid packet that was most recently received over the TDM-PW.

16. The router of claim 1 wherein the instructions to generate packets comprise instructions to generate packets which contain encapsulated TDM data containing only "1"s.

17. The router of claim 10 further comprising instructions in the memory that, when executed by the processor, cause the router to: monitor for receipt of a signal from the transmitting router that packets are being sent once again over the TDM-PW; and upon receipt of a signal from the transmitting router indicating that packets are being sent once again: halt the generation of packets; and resume placing received packets in a jitter buffer.

* * * * *